(12) United States Patent
Omori et al.

(10) Patent No.: US 11,316,926 B2
(45) Date of Patent: Apr. 26, 2022

(54) IN-VEHICLE NETWORK SYSTEM

(71) Applicant: TOYOTA JIDOSHA KABUSHIKI KAISHA, Toyota (JP)

(72) Inventors: Yoshifumi Omori, Nagoya (JP); Yoshiro Hirata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 15/842,333

(22) Filed: Dec. 14, 2017

(65) Prior Publication Data
US 2018/0176305 A1 Jun. 21, 2018

(30) Foreign Application Priority Data
Dec. 16, 2016 (JP) .............................. JP2016-244486

(51) Int. Cl.
*H04L 29/08* (2006.01)
*B60W 50/00* (2006.01)
(Continued)

(52) U.S. Cl.
CPC ............ *H04L 67/125* (2013.01); *B60L 15/20* (2013.01); *B60W 50/00* (2013.01); *H04L 67/12* (2013.01); *B60G 2800/96* (2013.01); *H04L 2012/40215* (2013.01); *H04L 2012/40273* (2013.01); *Y02T 10/72* (2013.01)

(58) Field of Classification Search
CPC .................. H04L 67/125; H04L 67/12; H04L 2012/40215; H04L 2012/40273; H04L 67/124; H04L 14/40071; H04L 12/40091; H04L 12/4013; H04L 12/40143;
(Continued)

(56) References Cited

U.S. PATENT DOCUMENTS

2005/0038573 A1* 2/2005 Goudy ................ B60R 16/0231
701/1
2009/0304021 A1 12/2009 Kraemer et al.
(Continued)

FOREIGN PATENT DOCUMENTS

CN 104823165 A 8/2015
DE 102006003067 A1 7/2007
(Continued)

*Primary Examiner* — Paula L Schneider
(74) *Attorney, Agent, or Firm* — Hunton Andrews Kurth LLP

(57) ABSTRACT

An in-vehicle network system includes a plurality of controllers configured to perform control of a vehicle, a plurality of transfer paths connected to the controllers, a relay device configured to relay data between the transfer paths, the relay device being connected to the transfer paths, a vehicle state detection unit configured to detect a predetermined state of the vehicle, a first specifying unit configured to specify the controller that transmits data with a low transmission priority in the predetermined state detected by the vehicle state detection unit or a transfer path other than a transfer path that transfers data related to the predetermined state detected by the vehicle state detection unit, and a first communication controller configured to cause the controller specified by the first specifying unit to suppress communication of data or suppress communication of data to the transfer path specified by the first specifying unit.

9 Claims, 11 Drawing Sheets

(51) Int. Cl.
*B60L 15/20* (2006.01)
*H04L 12/40* (2006.01)
*H04L 67/125* (2022.01)
*H04L 67/12* (2022.01)

(58) Field of Classification Search
CPC ....... B60L 15/20; B60W 50/00; B60W 30/00; B60G 2800/96; Y02T 10/7275; Y02T 10/72
USPC .......................................................... 701/1, 2
See application file for complete search history.

(56) References Cited

U.S. PATENT DOCUMENTS

2015/0301822 A1   10/2015   Takahashi et al.
2018/0203685 A1*  7/2018   Nakamura ................ G06F 8/65

FOREIGN PATENT DOCUMENTS

| DE | 102007034719 A1 | | 1/2009 | |
| EP | 1718008 A2 | | 11/2006 | |
| JP | 2008-283386 A | | 11/2008 | |
| JP | 102007034719 A1 | * | 1/2009 | ....... H04L 12/40169 |

* cited by examiner

| 90% OF MAXIMUM AMOUNT OF RELAY | xxx001 |
| 70% OF MAXIMUM AMOUNT OF RELAY | xxx002 |

| BUS | PREDETERMINED AMOUNT OF RELAY (THRESHOLD VALUE) |
|---|---|
| 121 | xxx011 |
| 122 | xxx012 |
| 123 | xxx013 |
| 124 | xxx014 |

FIG. 5

| STATE OF VEHICLE | DATA FOR SPECIFYING STATE OF VEHICLE | CONTROL DATA USED FOR CONTROL IN STATE OF VEHICLE | |
|---|---|---|---|
| NO DETECTION | — | — | |
| HIGH SPEED DRIVING | SPEED OF VEHICLE, NUMBER OF ENGINE ROTATIONS, OR THE LIKE | HIGH PRIORITY | TRAVELING CONTROL DATA |
| | | MEDIUM PRIORITY | SURROUNDING SURVEILLANCE DATA |
| | | LOW PRIORITY | DOOR CONTROL INFORMATION, INTERIOR LIGHT INFORMATION |
| AUTONOMOUS DRIVING | AUTONOMOUS DRIVING SELECTION DATA, SPEED OF VEHICLE, STEERING ANGLE, OR THE LIKE | HIGH PRIORITY | TRAVELING CONTROL DATA, SURROUNDING SURVEILLANCE DATA |
| | | MEDIUM PRIORITY | MULTIMEDIA INFORMATION |
| | | LOW PRIORITY | DOOR CONTROL INFORMATION, INTERIOR LIGHT INFORMATION |
| AUTOMATIC PARKING | AUTOMATIC PARKING SELECTION DATA, SPEED OF VEHICLE, STEERING ANGLE, OR THE LIKE | HIGH PRIORITY | SURROUNDING SURVEILLANCE DATA |
| | | MEDIUM PRIORITY | MULTIMEDIA INFORMATION |
| | | LOW PRIORITY | DOOR CONTROL INFORMATION, INTERIOR LIGHT INFORMATION |
| REPROGRAMMING (WIRED) | CONNECTION REQUEST DATA, SPEED OF VEHICLE, OR THE LIKE | HIGH PRIORITY | REWRITE DATA |
| | | MEDIUM PRIORITY | MULTIMEDIA INFORMATION |
| | | LOW PRIORITY | TRAVELING CONTROL DATA, DOOR CONTROL SYSTEM, INTERIOR LIGHT INFORMATION |
| REPROGRAMMING (WIRELESS) | CONNECTION REQUEST DATA, SPEED OF VEHICLE, OR THE LIKE | HIGH PRIORITY | REWRITE DATA |
| | | MEDIUM PRIORITY | MULTIMEDIA INFORMATION |
| | | LOW PRIORITY | TRAVELING CONTROL DATA |

FIG. 6

| CONTROL DATA | ECU 130 |
|---|---|
| NUMBER OF ENGINE ROTATIONS | ENGINE ECU 132A |
| STEERING ANGLE | STEERING ECU 133B |
| ... | ... |

FIG. 8A

| ECU-ID | SUPPRESSION POSSIBILITY DATA |
|---|---|
| ECU001 | 1 |

FIG. 8B

| NO. 1 (HIGH) | yyy001 |
|---|---|
| NO. 2 (MEDIUM) | yyy002 |
| NO. 3 (LOW) | yyy003 |

FIG. 11

| STATE OF VEHICLE | DATA FOR SPECIFYING STATE OF VEHICLE | CONTROL DATA USED FOR CONTROL IN STATE OF VEHICLE | | ALLOWABLE AMOUNT OF RELAY IN EACH BUS (%) | | | |
|---|---|---|---|---|---|---|---|
| | | | | BUS 121 | BUS 122 | BUS 123 | BUS 124 |
| NO DETECTION | - | - | | 20 | 30 | 30 | 20 |
| HIGH SPEED DRIVING | SPEED OF VEHICLE, NUMBER OF ENGINE ROTATIONS, OR THE LIKE | HIGH PRIORITY | TRAVELING CONTROL DATA | 10 | 40 | 40 | 10 |
| | | MEDIUM PRIORITY | SURROUNDING SURVEILLANCE DATA | | | | |
| | | LOW PRIORITY | DOOR CONTROL INFORMATION, INTERIOR LIGHT INFORMATION | | | | |
| AUTONOMOUS DRIVING | AUTONOMOUS DRIVING SELECTION DATA, SPEED OF VEHICLE, STEERING ANGLE, OR THE LIKE | HIGH PRIORITY | TRAVELING CONTROL DATA, SURROUNDING SURVEILLANCE DATA | 35 | 30 | 25 | 10 |
| | | MEDIUM PRIORITY | MULTIMEDIA INFORMATION | | | | |
| | | LOW PRIORITY | DOOR CONTROL INFORMATION, INTERIOR LIGHT INFORMATION | | | | |
| AUTOMATIC PARKING | AUTOMATIC PARKING SELECTION DATA, SPEED OF VEHICLE, STEERING ANGLE, OR THE LIKE | HIGH PRIORITY | SURROUNDING SURVEILLANCE DATA | 35 | 25 | 30 | 10 |
| | | MEDIUM PRIORITY | MULTIMEDIA INFORMATION | | | | |
| | | LOW PRIORITY | DOOR CONTROL INFORMATION, INTERIOR LIGHT INFORMATION | | | | |
| REPROGRAMMING (WIRED) | CONNECTION REQUEST DATA, SPEED OF VEHICLE, OR THE LIKE | HIGH PRIORITY | REWRITE DATA | 70 | 5 | 5 | 20 |
| | | MEDIUM PRIORITY | MULTIMEDIA INFORMATION | | | | |
| | | LOW PRIORITY | TRAVELING CONTROL DATA, DOOR CONTROL SYSTEM, INTERIOR LIGHT INFORMATION | | | | |
| REPROGRAMMING (WIRELESS) | CONNECTION REQUEST DATA, SPEED OF VEHICLE, OR THE LIKE | HIGH PRIORITY | REWRITE DATA | 40 | 25 | 25 | 10 |
| | | MEDIUM PRIORITY | MULTIMEDIA INFORMATION | | | | |
| | | LOW PRIORITY | TRAVELING CONTROL DATA | | | | |

IN-VEHICLE NETWORK SYSTEM

INCORPORATION BY REFERENCE

The disclosure of Japanese Patent Application No. 2016-244486 filed on Dec. 16, 2016 including the specification, drawings and abstract is incorporated herein by reference in its entirety.

BACKGROUND

1. Technical Field

The present disclosure relates to an in-vehicle network system.

2. Description of Related Art

In the related art, there is a data relay device that relays communication data between a first communication bus and a second communication bus, the data relay device including load level detection means for detecting a processing load of the data relay device, processing load determination means for determining whether or not the processing load detected by the load level detection means is equal to or greater than an upper limit value, and vacant frame transmission means for outputting a vacant frame indicating that the first communication bus or the second communication bus is in use to the first communication bus or the second communication bus when the processing load is equal to or greater than the upper limit value. Since the vacant frame is transmitted to the bus when the processing load is equal to or greater than the upper limit value, transmission of communication data by a node (Electronic Control Unit: ECU) is suppressed, and the processing load is reduced (see, for example, Japanese Unexamined Patent Application Publication No. 2008-283386 (JP 2008-283386 A)).

SUMMARY

Incidentally, the data relay device of the related art does not suppress transmission of the communication data according to a state of the vehicle. The state of the vehicle includes, for example, a variety of states of the vehicle such as a state in which the vehicle travels at a speed equal to or greater than a predetermined value, or a state in which parking support using a parking support function is performed.

Since the vehicle needs different data according to the state of the vehicle, the state of the vehicle is likely to be affected when the transmission of the communication data is not suppressed according to the state of the vehicle, as in the data relay device of the related art.

Therefore, the present disclosure provides an in-vehicle network system capable of suppressing the amount of relay of data according to the state of the vehicle.

A first aspect of the present disclosure relates to an in-vehicle network system including a plurality of controllers configured to perform control of a vehicle, a plurality of transfer paths connected to the controllers, a relay device configured to relay data between the transfer paths, the relay device being connected to the transfer paths, a vehicle state detection unit configured to detect a predetermined state of the vehicle, a first specifying unit configured to specify the controller that transmits data with a low transmission priority in the predetermined state detected by the vehicle state detection unit or a transfer path other than a transfer path that transfers data related to the predetermined state detected by the vehicle state detection unit, and a first communication controller configured to cause the controller specified by the first specifying unit to suppress communication of data or suppress communication of data to the transfer path specified by the first specifying unit.

Therefore, it is possible to suppress communication of data in the controller that transmits data with a relatively low priority or the transfer path not related to a desired state of the vehicle.

Therefore, it is possible to provide an in-vehicle network system capable of suppressing the amount of relay of data according to the state of the vehicle.

In the in-vehicle network system according to the first aspect of the present disclosure, the first communication controller may suppress communication of the data by transmitting a suppression command for suppressing data transmission to a controller that is specified by the first specifying unit or a transfer path that is specified by the first specifying unit.

Therefore, the controller that has received the suppression command suppresses the transmission of data.

Therefore, it is possible to provide an in-vehicle network system capable of suppressing the amount of relay of data according to the state of the vehicle by suppressing the data transmission of a predetermined controller according to the suppression command.

The in-vehicle network system according to the first aspect of the present disclosure may further include a relay amount controller configured to change the amount of relay by which the relay device relays data to each of the transfer paths. The relay amount controller may change the amount of relay so that the amount of relay in all of the transfer paths is reduced according to a predetermined state of the vehicle detected by the vehicle state detection unit when the first communication controller suppresses the communication of data to the transfer path specified by the first specifying unit. The first communication controller may transmit a suppression command for suppressing the data transmission to the transfer path specified by the first specifying unit in a state in which the amount of relay is changed by the relay amount controller.

Therefore, it is possible to change the amount of relay so that the amount of relay in all of the transfer paths is reduced using the relay amount controller.

Therefore, it is possible to provide an in-vehicle network system capable of suppressing the amount of relay of data according to the state of the vehicle by directly controlling the amount of relay in the relay device.

The in-vehicle network system according to the first aspect of the present disclosure may further include a relay amount acquisition unit configured to acquire the amount of relay by which the relay device relays the data. The first specifying unit may specify a controller that transmits data with a relatively low priority or a transfer path other than the transfer path that transfers data related to the predetermined state when the amount of relay is equal to or larger than a predetermined amount.

Therefore, it is possible to specify the controller that transmits data with a relatively low priority, or the transfer path other than the transfer path that transfers data related to a predetermined state according to the amount of relay of the relay device.

Therefore, it is possible to provide an in-vehicle network system capable of suppressing the amount of relay of data according to the state of the vehicle when the amount of relay of the relay device is larger than the predetermined amount.

The in-vehicle network system according to the first aspect of the present disclosure may further include a second specifying unit configured to specify a transfer path in which the amount of relay by which the relay device relays data to each of the transfer paths is maximum, and a second communication controller configured to suppress the amount of communication of data in the transfer path with the maximum amount of relay when the amount of relay in the transfer path specified by the second specifying unit is equal to or larger than a predetermined amount.

Therefore, it is possible to surveil the transfer path with the maximum amount of relay and perform the suppression of the amount of communication of data.

Therefore, it is possible to provide an in-vehicle network system capable of suppressing the amount of relay of data according to the state of the vehicle in accordance with the amount of relay of the transfer path with the maximum amount of relay.

In the in-vehicle network system according to the first aspect of the present disclosure, when the amount of relay in the transfer path specified by the second specifying unit is smaller than the predetermined amount, the vehicle state detection unit may detect the predetermined state. The first specifying unit may specify a controller that transmits data with a relatively low priority or a transfer path other than the transfer path that transfers data related to the predetermined state. The first communication controller may cause the controller specified by the first specifying unit to suppress the communication of data or suppress communication of data to the transfer path specified by the first specifying unit.

Therefore, in a state of the vehicle that is detected when the amount of relay in the transfer path with the maximum amount of relay is smaller than the predetermined amount, it is possible to suppress communication of data in the controller that transmits data with a relatively low priority, or the transfer path not related to the state of the vehicle.

Therefore, it is possible to provide an in-vehicle network system capable of suppressing the amount of relay of data according to the state of the vehicle that is detected when the amount of relay in the transfer path with the maximum amount of relay is smaller than the predetermined amount.

In the in-vehicle network system according to the first aspect of the present disclosure, when the amount of relay in the transfer path specified by the second specifying unit is equal to or larger than a predetermined amount after the second communication controller suppresses the amount of communication of data in the transfer path with the maximum amount of relay, the vehicle state detection unit may detect the predetermined state. The first specifying unit may specify a controller that transmits data with a relatively low priority or a transfer path other than the transfer path that transfers data related to the predetermined state. The first communication controller may cause the controller specified by the first specifying unit to suppress the communication of data or suppress communication of data to the transfer path specified by the first specifying unit.

Therefore, in a state of the vehicle that is detected when the amount of relay is equal to or larger than the predetermined amount after the amount of communication of data in the transfer path with the maximum amount of relay is suppressed, it is possible to suppress communication of data in the controller that transmits data with a relatively low priority, or the transfer path not related to the state of the vehicle.

Therefore, it is possible to provide the in-vehicle network system capable of suppressing the amount of relay of data according to the state of the vehicle that is detected when the amount of relay is equal to or larger than the predetermined amount after the amount of communication of data in the transfer path with the maximum amount of relay is suppressed.

It is possible to provide the in-vehicle network system capable of suppressing the amount of relay of data according to the state of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a diagram illustrating data that is used for a communication amount suppression process by a CGW-ECU;

FIG. 6 illustrates data in which control data is associated with an ECU that transmits the control data;

FIG. 8A is a diagram illustrating data that the ECU stores in a ROM;

FIG. 8B is a diagram illustrating data that the ECU stores in a ROM;

FIG. 11 is a diagram illustrating data that is used for a communication amount suppression process by the CGW-ECU.

DETAILED DESCRIPTION OF EMBODIMENTS

Hereinafter, embodiments to which the in-vehicle network system of the present disclosure has been applied will be described.

First Embodiment

Figure 1:
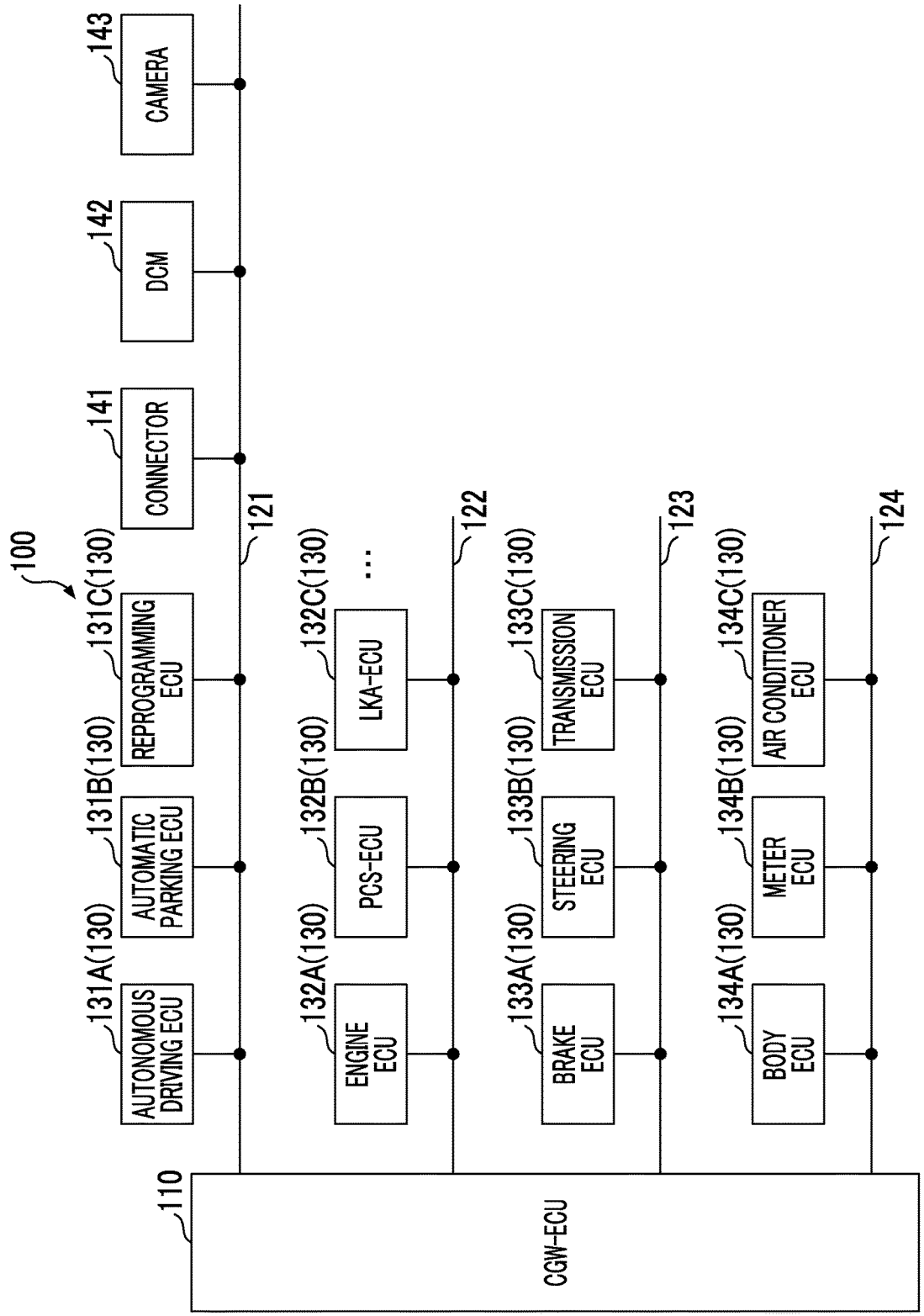
FIG. 1 is a diagram illustrating an example of a configuration of an in-vehicle network system according to the first embodiment.

FIG. 1 is a diagram illustrating an example of a configuration of an in-vehicle network system 100 of the first embodiment.

The in-vehicle network system 100 includes a Central Gateway (CGW)-Electronic Control Unit (ECU) 110, buses (network buses) 121, 122, 123, 124, and a plurality of ECUs 130.

The ECUs 130 are an autonomous driving ECU 131A, an automatic parking ECU 131B, a reprogramming ECU 131C, an engine ECU 132A, a Pre-Crash Safety (PCS)-ECU 132B, a Lane Keeping Assist (LKA)-ECU 132C, a brake ECU 133A, a steering ECU 133B, a transmission ECU 133C, a body ECU 134A, a meter ECU 134B, and an air conditioner ECU 134C.

Hereinafter, the autonomous driving ECU 131A, the automatic parking ECU 131B, the reprogramming ECU 131C, the engine ECU 132A, the PCS-ECU 132B, the LKA-ECU 132C, the brake ECU 133A, the steering ECU 133B, the transmission ECU 133C, the body ECU 134A, the meter ECU 134B, and the air conditioner ECU 134C are collectively referred to as ECUs 131A to 134C.

Further, the ECUs 131A to 134C are referred to as an ECU 130 unless otherwise distinguished. There may be ECUs other than the ECUs 131A to 134C as the ECUs 130. Here, the ECUs 131A to 134C are used in the description.

Figure 2:
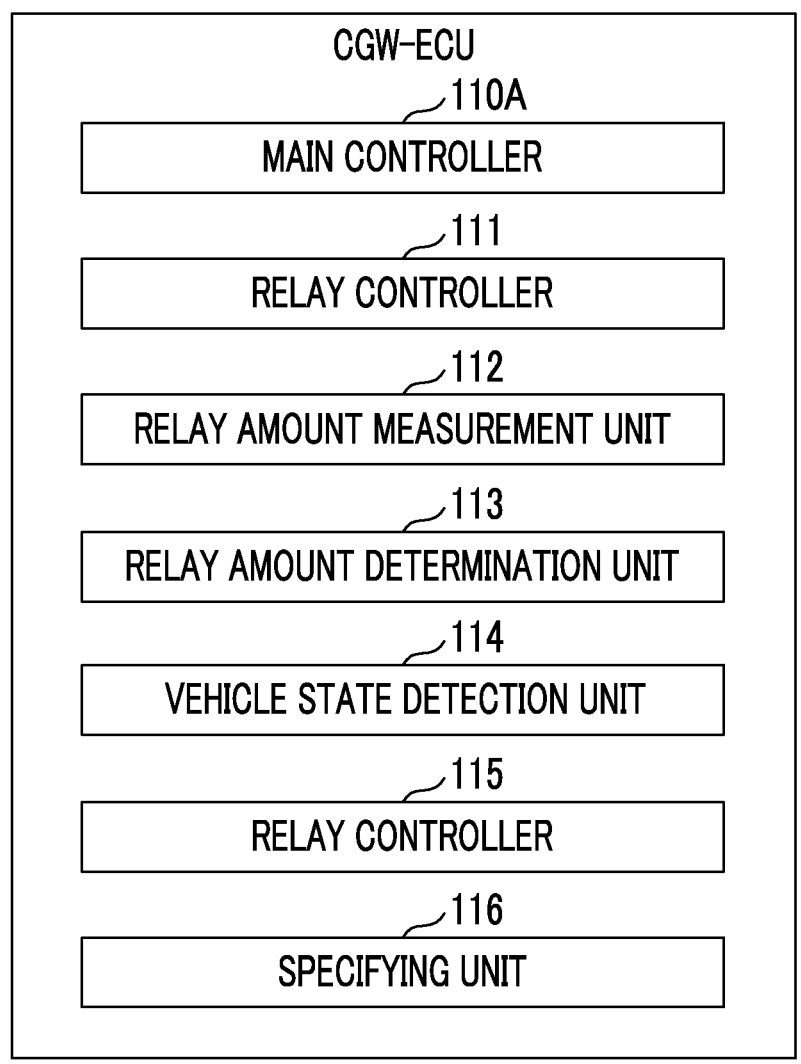
FIG. 2 is a block diagram illustrating an internal configuration of a CGW-ECU.
Figures 3, 4A, 4B:
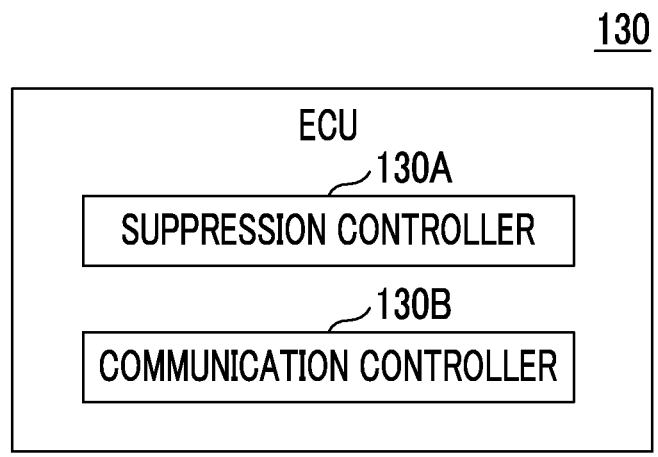
FIG. 3 is a block diagram illustrating an internal configuration of an ECU.
FIG. 4A is a diagram illustrating pieces of data indicating 90% and 70% of the maximum amount of relay.
FIG. 4B is a diagram illustrating data indicating a predetermined amount of relay (threshold)

Further, description will be given herein with reference to FIGS. 2 and 3, in addition to FIG. 1. FIG. 2 is a block diagram illustrating an internal configuration of the CGW-ECU 110. FIG. 3 is a block diagram illustrating an internal configuration of the ECU 130.

Although each of the CGW-ECU 110 and the ECUs 130 is realized by, for example, a computer including a central processing unit (CPU), a random access memory (RAM), a read only memory (ROM), a clock generation unit, an input and output interface, a communication interface, a transmission and reception unit, an internal bus, and the like, functional blocks that are realized by the CPU of the CGW-ECU 110 executing a predetermined program are illustrated in FIG. 2.

The in-vehicle network system 100 is mounted on the vehicle and performs communication among the ECUs 130. Hereinafter, the vehicle refers to a vehicle on which the in-vehicle network system 100 is mounted, unless otherwise specified.

The CGW-ECU 110 includes a main controller 110A, a relay controller 111, a relay amount measurement unit 112, a relay amount determination unit 113, a vehicle state detection unit 114, a relay controller 115, and a specifying unit 116. Further, buses 121, 122, 123, 124 are connected to the CGW-ECU 110.

The CGW-ECU 110 relays data that is output to the bus 121 by the autonomous driving ECU 131A, the automatic parking ECU 131B, and the reprogramming ECU 131C to the buses 122, 123, 124, and relays data that is output to the bus 122 by the engine ECU 132A, the PCS-ECU 132B, and the LKA-ECU 132C to the buses 121, 123, 124.

Further, the CGW-ECU 110 relays data that is output to the bus 123 by the brake ECU 133A, the steering ECU 133B, and the transmission ECU 133C to the buses 121, 122, 124, and relays data that is output to the bus 124 by the body ECU 134A, the meter ECU 134B, and the air conditioner ECU 134C to the buses 121, 122, 123. The CGW-ECU 110 is an example of a relay device and is a gateway device that relays data between the buses 121, 122, 123, 124.

Further, the buses 121, 122, 123 are buses that perform data communication according to a data format of Layer 2 of Ethernet (registered trademark), and the bus 124 is a bus that performs data communication according to a Controller Area Network (CAN) protocol. Therefore, the CGW-ECU 110 performs a data format conversion process when relaying data between the buses 121, 122, 123 and the bus 124. The CGW-ECU 110 is a multi-protocol gateway device that relays data according to a plurality of protocols. The data format conversion process is performed by the relay controller 111.

A connector 141 that connects a cable for a diagnosis tool, a Data Communication Module (DCM) 142, and a camera 143 that acquires images of the surroundings of the vehicle are connected to the bus 121. The DCM 142 is an example of an in-vehicle wireless communication device, and performs wireless communication via a communication line such as Third Generation (3G), Fourth Generation (4G), or Long Term Evolution (LTE). For example, the camera 143 is provided at each of the four places on the front, rear, right, and left of the vehicle to be able to acquire images of the surroundings of the vehicle. Further, the CGW-ECU 110 relays data, which is output from the connector 141, the DCM 142, or the camera 143 to the bus 121, to the buses 122, 123, or 124, and relays the data, which is output from any one of the ECUs 130 to the bus 122, 123, or 124, from the connector 141, the DCM 142, or the camera 143 to the bus 121.

By the CGW-ECU 110 relaying data between the buses 121, 122, 123, 124 and converting the data format according to a protocol of the bus that is a transfer destination as described above, the ECUs 131A to 134C can perform data communication with each other via the buses 121, 122, 123, 124. An identification (ID) is allocated to each of the ECUs 131A to 134C and the ECU that is a transmission destination among the ECUs 131A to 134C is determined by the ID included in the data to be transmitted.

The main controller 110A is a controller that controls a process of the CGW-ECU 110. The main controller 110A executes a process other than processes performed by the relay controller 111, the relay amount measurement unit 112, the relay amount determination unit 113, the vehicle state detection unit 114, the relay controller 115, and the specifying unit 116.

The relay controller 111 relays data between the buses 121, 122, 123, 124 and performs a process of converting the data format according to the protocol of the bus that is a transfer destination. The relay controller 111 functions as an L2 switch with respect to relaying of data on the bus 121, 122, 123, and relays data according to a data format of Layer 2 of the Ethernet. Further, the relay controller 111 relays the data according to a data format of the CAN protocol with respect to relaying of data on the bus 124.

Further, the relay controller 111 converts the data according to the data format of Layer 2 of Ethernet communicated by the bus 121, 122, or 123 into data according to the data format of the CAN protocol and relays the resultant data to the bus 124. Further, the relay controller 111 converts the data in the data format of the CAN protocol communicated by the bus 124 into data according to the data format of Layer 2 of Ethernet, and relays the resultant data to the bus 121, 122, or 123.

The relay amount measurement unit 112 measures the amount of relay of data based on the time needed for relay of data in the relay controller 111. The time needed for relay of data in the relay controller 111 is a time needed until the relay controller 111 receives data from any one of the buses 121, 122, 123, 124 and transmits the data to any other bus. In the relay amount measurement unit 112, a portion that measures the amount of relay is an example of a relay amount acquisition unit. When the time needed for relaying is long, the amount of relaying is large, and when the time needed for relaying is short, the amount of relaying is small. By calculating a relationship between the time needed for relaying and the amount of relay in advance, the amount of relay can be obtained from the time needed for relaying.

Further, the relay amount measurement unit 112 can specify a bus with the maximum amount of relay. In the relay amount measurement unit 112, a portion that specifies the bus with the maximum amount of relay is an example of a second specifying unit.

The relay amount determination unit 113 determines whether the amount of relay of the CGW-ECU 110 is equal to or larger than 90% of the maximum amount of relay that can be relayed by the buses 121, 122, 123, 124. Further, the relay amount determination unit 113 determines whether the amount of relay of the bus with the maximum amount of relay specified by the relay amount measurement unit 112 is equal to or larger than a predetermined amount of relay (threshold). Further, the relay amount determination unit 113 determines whether the amount of relay of the CGW-ECU 110 is equal to or smaller than 70% of the maximum amount of relay that can be relayed by the buses 121, 122, 123, 124. For the determination, a threshold value stored in the ROM (pieces of data indicating 90% and 70% of the maximum amount of relay and data indicating a predetermined amount of relay (threshold)) is used.

The vehicle state detection unit 114 detects the state of the vehicle based on the type of data that is relayed by the relay controller 111. The state of the vehicle includes, for example, various states such as a state in which the vehicle travels at a speed equal to or greater than a predetermined value, a state in which autonomous driving is performed at Level 1 determined by the National Highway Traffic Safety Administration (NHTSA) in United States or higher, a state in which parking support using a parking support function is performed, and a state in which data written to a vehicle-mounted memory is updated using a reprogramming function.

After the relay amount determination unit 113 determines that the amount of relay is equal to or larger than 90% of the maximum amount of relay, the relay controller 115 issues a warning for suppressing the amount of relay of the bus with the maximum amount of relay. That is, the relay controller 115 transmits data indicating the warning to the bus with the maximum amount of relay. As a result, when the ECU 130 connected to the bus with the maximum amount of relay receives the alarm and suppresses the transmission of data to the bus, the amount of communication of data on the bus with the maximum amount of relay is suppressed and the amount of relay of the CGW-ECU 110 is also suppressed.

Further, the relay controller 115 transmits a transmission suppression command to the ECU 130 that transmits data with a low transmission priority in a predetermined state of the vehicle specified by the vehicle state detection unit 114 in a predetermined case after the bus with the maximum amount of relay is specified by the relay amount measurement unit 112. As a result, when the ECU 130 corresponding to the data with a low priority suppresses the transmission of data to the bus (any one of 121 to 124), the amount of data communication on the bus is suppressed, and the amount of relay of the CGW-ECU 110 is suppressed. Any one of the ECUs 131A to 134C that is a transmission destination is determined by the ID included in the transmission suppression command. The relay controller 115 is an example of a first communication controller and a second communication controller.

The specifying unit 116 reads data indicating the priority of the control data in the state of the vehicle and specifies the ECU 130 that transmits data with a low priority in a predetermined state of the vehicle specified by the vehicle state detection unit 114 when the relay amount determination unit 113 determines that the amount of relay is not equal to or smaller than 70% of the maximum amount of relay after the relay amount determination unit 113 determines that the amount of relay is equal to or greater than 90% of the maximum amount of relay and the warning for suppressing the amount of relay of the bus with the maximum amount of relay is issued. The specifying unit 116 is an example of a first specifying unit.

Since the buses 121, 122, 123 perform data communication according to a data format of Layer 2 of the Ethernet and the bus 124 performs data communication according to the CAN protocol, the buses 121, 122, 123 perform data communication at a higher speed than that for the bus 124. The buses 121 to 124 are examples of a transfer path.

The autonomous driving ECU 131A, the automatic parking ECU 131B, and the reprogramming ECU 131C are connected to the bus 121, and the engine ECU 132A, the PCS-ECU 132B, and the LKA-ECU 132C are connected to the bus 122. Further, the brake ECU 133A, the steering ECU 133B, and the transmission ECU 133C are connected to the bus 123, and the body ECU 134A, the meter ECU 134B, and the air conditioner ECU 134C are connected to the bus 124. In the ECUs 134A to 134C connected to the bus 124, the ECUs 131A to 133C connected to the buses 121, 122, 123 are ECUs that do not need high-speed data communication.

As illustrated in FIG. 3, the ECU 130 includes a suppression controller 130A and a communication controller 130B.

When the suppression controller 130A receives the suppression alarm from the CGW-ECU 110, the suppression controller 130A determines whether or not the ECU 130 including the suppression controller 130A can suppress the transmission of the data, and suppresses the transmission of the data when the ECU 130 can suppress the transmission of the data. Here, suppressing the transmission of data may include setting the amount of transmission to zero by reducing the amount of data to be transmitted.

Further, in a case where the suppression controller 130A determines that the transmission of data cannot be suppressed even when the suppression alarm is received, the suppression controller 130A performs a process of suppressing transmission of data when receiving the transmission suppression command. The meaning of suppressing the transmission of data is as described above. A transmission data suppression process that is performed by the suppression controller 130A will be described below.

When the process of suppressing data transmission is performed by the suppression controller 130A, the communication controller 130B suppresses transmission of data to the buses (any one of 121 to 124).

The ECUs 131A to 134C are control devices that execute control of the vehicle. The autonomous driving ECU 131A, the automatic parking ECU 131B, the engine ECU 132A, the PCS-ECU 132B, the LKA-ECU 132C, the brake ECU 133A, the steering ECU 133B, and the transmission ECU 133C are ECUs that perform control regarding the traveling of the vehicle (control regarding traveling, turning, or stopping), and are traveling system ECUs. The reprogramming ECU 131C, the body ECU 134A, the meter ECU 134B, and the air conditioner ECU 134C are ECUs that perform control or the like other than the control regarding the traveling of the vehicle (the control regarding traveling, turning, or stopping), and are non-traveling system ECUs. A sensor that detects information on the vehicle or the like is connected to the ECUs 131A to 134C.

Here, the ECUs 131A to 134C are merely examples, and still another type of ECU is connected to the buses 121, 122, 123, 124.

The autonomous driving ECU 131A is an ECU that performs control of autonomous driving of level 1 determined by the National Highway Traffic Safety Administration (NHTSA) in United States or higher. The autonomous driving ECU 131A outputs travel control data for causing the vehicle to travel, to the bus 121 using surroundings surveillance data (a camera image, target information, route information, or the like) of the vehicle. Further, the autonomous driving ECU 131A displays data (multimedia data) indicating a traveling situation on a display panel or the like in the vehicle.

Further, the camera image is an image acquired by the camera 143 (see FIG. 1) mounted on the vehicle and is, for example, an image that is acquired by the camera 143 directed to the front, rear, and side of the vehicle. Further, the target information is data such as an image indicating a feature, a building, or the like that is used for a three-dimensional (3D) map. Further, the path information is data indicating a position and a path of the vehicle in the map data.

Further, the travel control data for causing the vehicle to travel includes an accelerator operation amount, the amount of control for controlling a braking force of the brake, the amount of steering, lighting control data of a winker, lighting control data of lights, and the like and is, for example, control data needed for control of the ECUs 131A to 134C when the vehicle is caused to travel according to level 1, 2, 3, or 4 determined by the National Highway Traffic Safety Administration (NHTSA) in United States.

Here, although a level of autonomous driving is represented by, for example, a level determined by the National Highway Traffic Safety Administration (NHTSA) in United States, the level of the autonomous driving or the aspect of the autonomous driving may be represented according to other standards or the like. In this case, the autonomous driving may refer to the vehicle performing at least one of an accelerator operation, a steering operation, and a brake operation.

The automatic parking ECU 131B outputs control data for moving the vehicle to a predetermined parking space in a parallel parking scheme or a garage parking scheme using surroundings surveillance data (a camera image, detection information of a clearance sonar, or the like) of the vehicle to the bus 121. Further, the automatic parking ECU 131B displays an image of the rear or the front of the vehicle on a display panel or the like in the vehicle.

The automatic parking ECU 131B may be, for example, of a type that performs all of a steering operation, an accelerator operation, and a brake operation, or may be of a type of performing solely the steering operation, delivering the amount of an operation to a driver with respect to the accelerator operation and the brake operation, and requesting the driver to perform the operation. Further, the automatic parking ECU 131B may be of a type in which a user of the vehicle outside the vehicle remotely operates the vehicle using a key of the vehicle and a smartphone terminal, and the automatic parking ECU 131B moves the vehicle (an unmanned vehicle without a driver or a passenger) according to content of the operation. In this case, the automatic parking ECU 131B displays data (multimedia data) indicating a movement situation for parking on the display panel or the like of the key or the smartphone terminal.

The reprogramming ECU 131C is an ECU that rewrites (reprograms) a program or data stored in a memory of any one of the ECUs 131A, 131B, 132A to 134C, and an ECU not illustrated in FIG. 1. There are a case in which the reprogramming is performed by connecting a cable for a diagnosis tool to the connector 141 (see FIG. 1) connected to the bus 121 (in a wired connection state), and a case in which the reprogramming is performed in a state in which the vehicle and the diagnosis tool are connected through wireless communication using the DCM 142 (see FIG. 1) connected to the bus 121.

The engine ECU 132A is an ECU that controls the output of the engine based on the accelerator operation amount, the vehicle speed, or the like. In the case of a hybrid vehicle (HV) and an electric vehicle (EV), an HV-ECU that controls an output of the engine or the drive motor and an EV-ECU that controls an output of the driving motor may be used in place of the engine ECU 132A. The accelerator operation amount is detected by an accelerator position sensor, and the vehicle speed is detected by a vehicle speed sensor.

The PCS-ECU 132B is an ECU that generates an alarm (PCS alarm) for avoidance of collision with an obstacle in front of the vehicle and performs control of an operation of an automatic brake (hereinafter referred to as a PCS brake) for avoiding a collision with the object, based on the vehicle speed, the distance from the obstacle in the front of the vehicle, or the like. The distance from the obstacle in front of the vehicle is detected, for example, by a millimeter-wave radar device and a monocular camera. Further, the distance from the obstacle in front of the vehicle may be detected using a stereo camera.

The LKA-ECU 132C is an ECU that performs control of the steering angle so that the vehicle does not depart from the lane on which the vehicle is currently traveling, based on the image or the like of the front of the vehicle detected by the monocular camera or the like.

The brake ECU 133A is an ECU that executes control for realizing a function of an anti-lock brake system (ABS) and a function of a vehicle stability control (VSC) based on, for example, the oil pressure detected by an oil pressure sensor provided in a master cylinder. Further, the brake ECU 133A performs control of the PCS brake in conjunction with the PCS-ECU 132B.

The steering ECU 133B is an ECU that performs control of an electric motor for assistance of electric power steering based on a vehicle speed or a steering torque. The steering torque is detected by a torque sensor that detects a torque that a driver inputs to the steering wheel.

The transmission ECU 133C is an ECU that performs control of a shift of a transmission, or the like according to the operation of a shift lever, a vehicle speed, or the like. The transmission is an automatic transmission using a torque converter, a continuous variable transmission (CVT; belt type continuous variable transmission), or the like.

The body ECU 134A is an ECU that performs, for example, detection of the opening and closing state of the door of the vehicle, and opening and closing control of side windows or the like.

The meter ECU 134B is an ECU that performs control of various meters such as a speedometer or a tachometer of a meter panel of the vehicle, various alarm lights, or the like.

The air conditioner ECU 134C is an ECU that performs control of an air conditioner to adjust the temperature and the humidity of air inside a vehicle cabin.

FIG. 4A is a diagram illustrating pieces of data indicating 90% and 70% of the maximum amount of relay. FIG. 4B is a diagram illustrating data indicating a predetermined amount of relay (threshold). As illustrated in FIG. 4A, the pieces of data indicating 90% and 70% of the maximum amount of relay are xxx001 and xxx002, respectively. Further, as shown in FIG. 4B, the pieces of data indicating the predetermined amount of relay (threshold) for the buses 121 to 124 are xxx011, xxx012, xxx013, xxx014. The data is stored in the ROM of the CGW-ECU 110.

The relay amount determination unit 113 reads pieces of data indicating 90% and 70% of the maximum amount of relay illustrated in FIG. 4A and data indicating the predetermined amount of relay (threshold) for the buses 121 to 124 illustrated in FIG. 4B from the ROM and performs a determination process.

FIG. 5 is a diagram illustrating data that the CGW-ECU 110 uses for a process of suppressing the amount of communication. The data in a table format illustrated in FIG. 5 is data in which a state of the vehicle, data for specifying the state of the vehicle, and control data that is used for control in the state of the vehicle are associated, and is stored in the ROM of the CGW-ECU 110.

The state of the vehicle is, for example, a state in which high-speed driving is performed (a state in which the vehicle travels at a speed equal to or greater than a predetermined value), a state in which autonomous driving is performed, a state in which parking support using a parking support function is performed, and a state in which reprogramming is performed (wired and wireless). The state is an example of a predetermined state of the vehicle, and is detected by the vehicle state detection unit 114. No detection refers to a state in which any of the vehicle states is not detected.

The data for specifying the state of the vehicle is data that is used to specify each of the above-described states of the vehicle among the pieces of data that are transferred via any one of the buses 121 to 124. For example, in high-speed driving, the data for specifying the state of the vehicle is data indicating the vehicle speed, the number of engine rotations, or the like. In autonomous driving, the data for specifying the state of the vehicle is autonomous driving selection data (data indicating that a user of the vehicle has operated a button for selecting autonomous driving, or the like), data indicating the vehicle speed or the steering angle, or the like. Further, in the automatic parking, the data for specifying the state of the vehicle is automatic parking selection data (data indicating that the user of the vehicle has operated a button for selecting automatic parking, or the like), data indicating the vehicle speed or the steering angle, or the like.

Further, in reprogramming (wired), the data for specifying the state of the vehicle is data indicating a connection request (connection request data) that is output from the diagnosis tool to the bus via the connector 141 for a diagnosis tool (see FIG. 1), data indicating the vehicle speed, and the like. Further, in reprogramming (wireless), the data for specifying the state of the vehicle is data indicating a connection request (connection request data) that is output from the diagnosis tool to the bus via the DCM 142 (see FIG. 1), data indicating the vehicle speed, and the like.

The control data that is used for control in the state of the vehicle is control data that is transferred by any one of the buses 121 to 124 in order to realize a state of each vehicle. The control data is output to, for example, any one of the buses 121 to 124 for any one of the ECUs to control the vehicle.

A priority (a high priority, a medium priority, and a low priority) is assigned to the control data that is used for control in the state of the vehicle. For example, the control data with a high priority in high-speed driving is travel control data, the control data with a medium priority is surroundings surveillance data, and the control data with a low priority is door control information and interior light information. The travel control data in high-speed driving is control data related to traveling, turning, and stopping of the vehicle and is, for example, a degree of throttle opening, hydraulic pressure in a master cylinder, and a steering angle. The surroundings surveillance data in high-speed driving is, for example, data indicating the presence or absence of detection of millimeter waves around the vehicle. The door control information and the interior light information are data that is output to the bus 124 by the body ECU 134A and are pieces of data indicating an opened or closed state of the door of the vehicle and a lighting state of a light in the vehicle, such as a room lamp, respectively.

Further, the control data with a high priority in the autonomous driving is travel control data or surroundings surveillance data, control data with a medium priority is multimedia information, and control data with a low priority is door control information and interior light information. The surroundings surveillance data in the autonomous driving is, for example, a camera image, target information, and path information. The travel control data, the door control information, and the interior light information are the same as that in high-speed driving.

Further, the control data with a high priority in automatic parking is the surroundings surveillance data, the control data with a medium priority is the multimedia information, and the control data with a low priority is the door control information and the interior light information. The surroundings surveillance data in the automatic parking is, for example, a camera image or detection information of a clearance sonar, and the multimedia information is data (multimedia data) indicating a movement situation for parking, and is data indicating information displayed on the display panel or the like of the key or the smartphone terminal. The door control information and the interior light information are the same as that in the high-speed driving and the autonomous driving.

Further, the control data with a high priority in the reprogramming (wired) is rewrite data, the control data with a medium priority is the multimedia information, and the control data with a low priority is the travel control data, the door control information, and the interior light information. The rewrite data in the reprogramming (wired) is, for example, data for rewriting a program or data stored in the memory of any one of the ECUs 131A, 131B, 132A to 134C, and ECUs not illustrated in FIG. 1.

The multimedia information in reprogramming (wired) is data indicating information to be displayed on the display panel or the like in the vehicle. The travel control data, the door control information, and the interior light information are the same as that in high-speed driving and autonomous driving.

Further, the control data with a high priority in reprogramming (wireless) is rewrite data, the control data with a medium priority is multimedia information, and the control data with a low priority is travel control data. The rewrite data in reprogramming (wireless) is, for example, data for rewriting a program or data stored in the memory of any one of the ECUs 131A, 131B, 132A to 134C, and ECUs not illustrated in FIG. 1. Since rewriting is performed in wireless communication, the data includes data that is rewritten during traveling of vehicle, unlike rewritten data in the reprogramming (wired). Further, with the difference as described above, multimedia information in reprogramming (wireless) is slightly different from multimedia information in reprogramming (wired). The travel control data is the same as high-speed driving, autonomous driving, and reprogramming (wired).

FIG. 6 illustrates data in which the control data and the ECU 130 that transmits the control data are associated. In the data in table format shown in FIG. 6, for example, the engine ECU 132A is shown as the ECU 130 that transmits the number of engine rotations, and the steering ECU 133B is shown as the ECU 130 that transmits the steering angle. Here, although a part of the data is solely shown, all pieces of control data transferred on the buses 121 to 124 and the ECU 130 that transmits the control data are associated in the data in a table format shown in FIG. 6.

Figure 7:
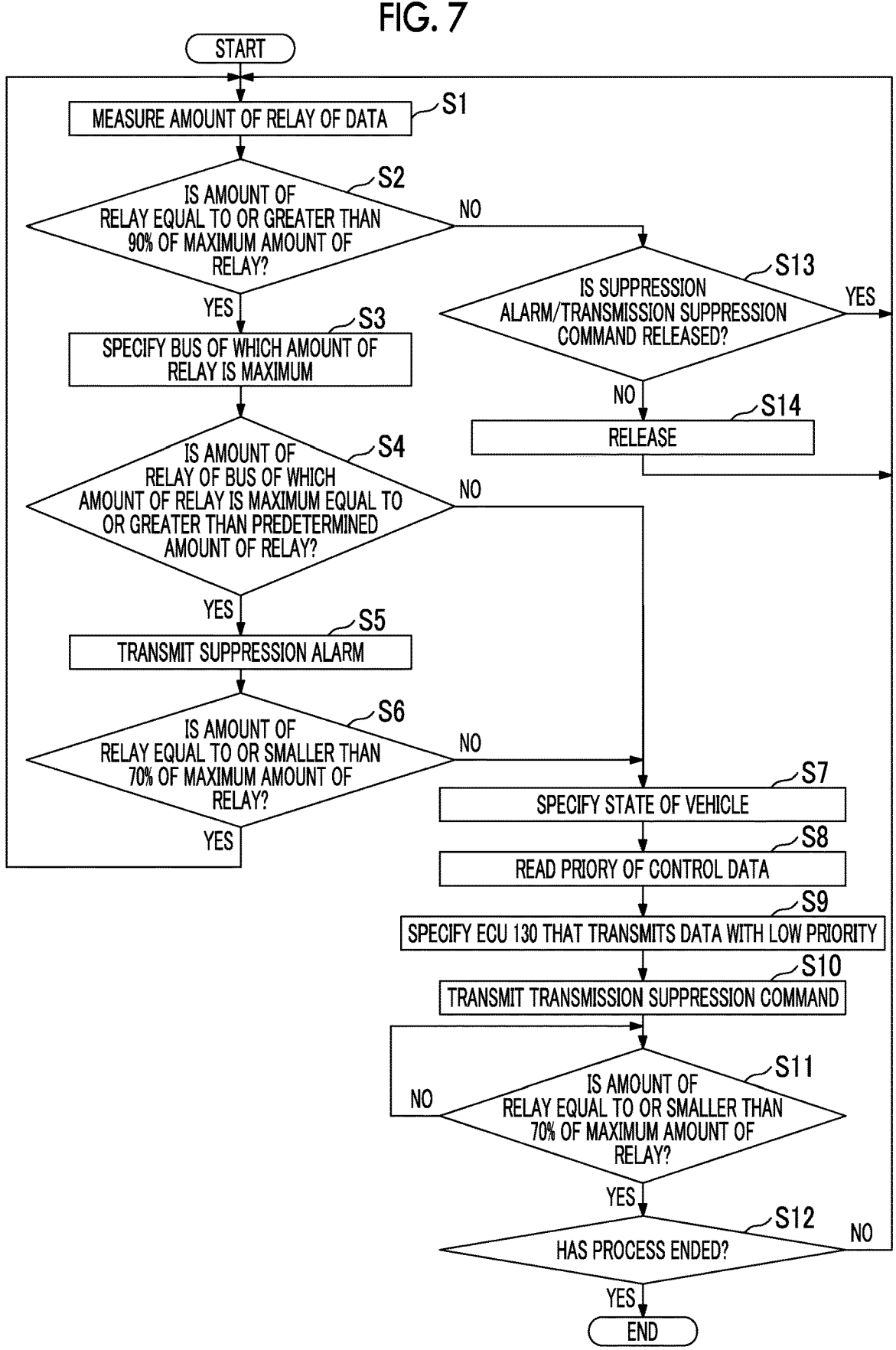
FIG. 7 is a diagram illustrating a flowchart of a process in which the CGW-ECU controls the amount of relay of a bus according to the state of a vehicle.

FIG. 7 is a diagram illustrating a flowchart of a process in which the CGW-ECU 110 controls the amount of relay of the bus according to the state of the vehicle.

The main controller 110A may start the process. The main controller 110A starts the process, for example, when an ignition switch of the vehicle is turned ON.

The relay amount measurement unit 112 measures the amount of relay of data based on the time needed for relay of the data in the relay controller 111 (step S1). The time needed for the relay is a time needed until data received from one of the buses 121 to 124 is transmitted to the other bus (one of 121 to 124). When the time needed for relaying is long, the amount of relaying is large, and when the time needed for relaying is short, the amount of relaying is small.

The relay amount determination unit 113 determines whether or not the amount of relay of the CGW-ECU 110 is equal to or larger than 90% of the maximum amount of relay that can be relayed by the buses 121, 122, 123, 124 (step S2).

When the relay amount determination unit 113 determines that the amount of relay of the CGW-ECU 110 is equal to or larger than 90% of the maximum amount of relay (S2: YES), the relay amount measurement unit 112 specifies the bus with the maximum amount of relay (step S3).

Then, the relay amount determination unit 113 determines whether or not the amount of relay of the bus of which the amount of relay specified in step S3 is maximum is equal to or larger than the predetermined amount of relay (threshold) (step S4). Data indicating the predetermined amount of relay (threshold) (see FIG. 4B) is stored in the ROM of the CGW-ECU 110 for each of the buses 121 to 124 in advance. The relay amount determination unit 113 reads the data indicating the predetermined amount of relay (threshold) corresponding to the bus (any one of 121 to 124) of which the amount of relay specified in step S3 is maximum from the ROM, and performs the determination process of step S4.

When the relay controller 115 determines that the amount of relay of the bus with the maximum amount of relay is equal to or larger than a predetermined amount of relay (threshold) (S4: YES), the relay controller 115 issues a warning (suppression alarm) for suppressing the amount of relay of the bus with the maximum amount of relay (step S5). Data indicating the suppression alarm is output from the CGW-ECU 110 to the bus (one of 121 to 124) with the maximum amount of relay, and is received by the ECU 130 that is connected to the bus with the maximum amount of relay. As a result, when the ECU 130 that is connected to the bus with the maximum amount of relay suppresses the transmission of data to the bus, the amount of communication of data in the bus with the maximum amount of relay is suppressed and the amount of relay of the CGW-ECU 110 is also suppressed.

For example, when the bus with the maximum amount of relay is the bus 122, data indicating the suppression alarm is transmitted from the CGW-ECU 110 to the bus 122 and received by the ECUs 132A to 132C. When at least one of the ECUs 132A to 132C suppresses the transmission of data to the bus 122, the amount of communication of data to the bus 122 with the maximum amount of relay is suppressed. The amount of relay of the CGW-ECU 110 is suppressed.

Then, the relay amount determination unit 113 determines whether or not the amount of relay of the CGW-ECU 110 is equal to or smaller than 70% of the maximum amount of relay that can be relayed by the buses 121, 122, 123, 124 (step S6).

When the relay amount determination unit 113 determines that the amount of relay of the CGW-ECU 110 is equal to or smaller than 70% of the maximum amount (S6: YES), the main controller 110A causes the flow to return to step S1.

On the other hand, when the relay amount determination unit 113 determines that the amount of relay of the CGW-ECU 110 is not equal to or smaller than 70% of the maximum amount (S6: NO), the vehicle state detection unit 114 specifies the state of the vehicle based on the type of data that is transferred by the buses 121 to 124 (step S7).

Then, the specifying unit 116 reads data indicating the priority of the control data in the state of the vehicle specified in step S7 by referring to the data in the table format shown in FIG. 5 using the state of the vehicle specified in step S7 (step S8).

Then, the specifying unit 116 specifies the ECU 130 that transmits data with a low priority among the pieces of data indicating the priority read in step S8 (step S9).

The relay controller 115 transmits the transmission suppression command to the ECU 130 specified by the specifying unit 116 (step S10). More specifically, the specifying unit 116 specifies the ECU 130 corresponding to the data with a low priority by referring to the data shown in FIG. 6, and the relay controller 115 transmits the transmission suppression command to the specified ECU 130. As a result, when the ECU 130 corresponding to the data with a low priority suppresses the transmission of data to the bus (any one of 121 to 124), the amount of data communication on the bus is suppressed, and the amount of relay of the CGW-ECU 110 is suppressed.

Then, the relay amount determination unit 113 determines whether or not the amount of relay of the CGW-ECU 110 is equal to or smaller than 70% of the maximum amount of relay that can be relayed by the buses 121, 122, 123, 124 (step S11). The process of step S11 is the same as the process of step S6.

When the relay amount determination unit 113 determines that the amount of relay of the CGW-ECU 110 is not equal to or smaller than 70% of the maximum amount of relay (S11: NO), the relay amount determination unit 113 repeats the process of step S11. This is to wait until the amount of relay of the CGW-ECU 110 becomes equal to or smaller than 70% of the maximum amount of relay.

When the relay amount determination unit 113 determines that the amount of relay of the CGW-ECU 110 is equal to or smaller than 70% of the maximum amount of relay (S11: YES), the main controller 110A determines whether or not to end the process (step S12).

When the main controller 110A determines to end the process (S12: YES), the main controller 110A ends the series of processes. For example, when an ignition switch of the vehicle is turned OFF, the main controller 110A ends the process.

When the main controller 110A determines not to end the process (S12: NO), the main controller 110A causes the flow to return to step S1.

In step S4, when the relay amount determination unit 113 determines that the amount of relay of the bus with the maximum amount of relay is not equal to or larger than the predetermined amount of relay (threshold) (S4: NO), the main controller 110A causes the flow to proceed to step S7. As a result, the vehicle state detection unit 114 specifies the state of the vehicle (step S7). When the amount of relay of the bus with the maximum amount of relay is not equal to or larger than the predetermined amount of relay (threshold), the flow is caused to proceed to step S7 in order to determine how to suppress the amount of relay in which of the states of the vehicle.

Further, when the relay amount determination unit 113 determines that the amount of relay of the CGW-ECU 110 is not equal to or larger than 90% of the maximum amount of relay in step 2 (S2: NO), the main controller 110A determines whether the suppression alarms transmitted in step S5 or the transmission suppression command transmitted in step S10 is released (step S13). The process of step S13 is a process in which, when both of the suppression alarm and the transmission suppression command are transmitted, the main controller 110A determines whether both are released, when solely the suppression alarm is transmitted, the main controller 110A determines whether the suppression alarm is released, and when solely the transmission suppression command is transmitted, the main controller 110A determines whether the transmission suppression command is released.

When the main controller 110A determines that the suppression alarm and the transmission suppression command are released (S13: YES), the main controller 110A causes the flow to return to step S1.

Further, when the main controller 110A determines that the suppression alarm and the transmission suppression command are not released (S13: NO), the main controller 110A transmits a release command for releasing the suppression alarm and/or the transmission suppression command that has not been released, to the ECU 130 (step S14). When the main controller 110A ends the process of step S14, the main controller 110A causes the flow to return to step S1.

As described above, the CGW-ECU 110 performs the process of controlling the amount of relay.

FIGS. 8A and 8B are diagrams illustrating data that the ECU 130 stores in the ROM. In FIG. 8A, data indicating whether or not the transmission of data can be suppressed (suppression possibility data) when the suppression alarm is received is illustrated. In FIG. 8B, priority data that is referenced when the transmission suppression command is received is illustrated. Although data other than the data illustrated in FIGS. 8A and 8B is also stored in a ROM of the ECU 130, solely data related to the process of controlling the amount of relay in the in-vehicle network system 100 is illustrated herein.

As illustrated in FIG. 8A, the suppression possibility data is associated with the ID of the ECU 130 (ECU-ID). The ECU-ID is assigned to each of the ECUs 131A to 134C. In FIG. 8A, for example, ECU001 is illustrated. When a value of the suppression possibility data is 0, this indicates that the transmission of data can be suppressed. When the value is 1, this indicates that the transmission of data cannot be suppressed.

The value of the suppression possibility data is determined, for example, according to whether or not the ECU 130 is in a traveling system. Since the ECU 130 in the traveling system handles travel control data with a relatively high priority, the value of the suppression possibility data is set to one. The value of the suppression possibility data is set to zero for the ECU 130 in a non-traveling system. Even when the ECU 130 in the non-traveling system handles travel control data with a relatively high priority, the value of the suppression possibility data may be set to one. Further, determining the value of the suppression possibility data according to whether the ECU 130 is in the traveling system or in the non-traveling system is one example, and the value of the suppression possibility data may be determined according to other criteria.

Further, as illustrated in FIG. 8B, for the priority data that is referenced by the ECU 130 when the transmission suppression command is received, data that is transmitted by the ECU 130 is distributed to a priority with three steps (No. 1 (high), No. 2 (medium), and No. 3 (low)) according to a type of each ECU 130 and is associated with each priority.

In FIG. 8B, for example, No. 1 is yyy001, No. 2 is yyy002, and No. 3 is yyy003. What data is the data with each priority is determined according to the type of the ECU 130. For example, in the transmission ECU 133C, data indicating a P (parking) position is an example of data of No. 1, data indicating how fast is a gear is an example of data of No. 2, and data indicating a mode of the transmission (a sports mode, a normal mode, and an economy mode) is an example of data of No. 3. The data that is transmitted by each ECU 130 is associated with the priority and stored, as illustrated in FIG. 8B.

Figure 9:
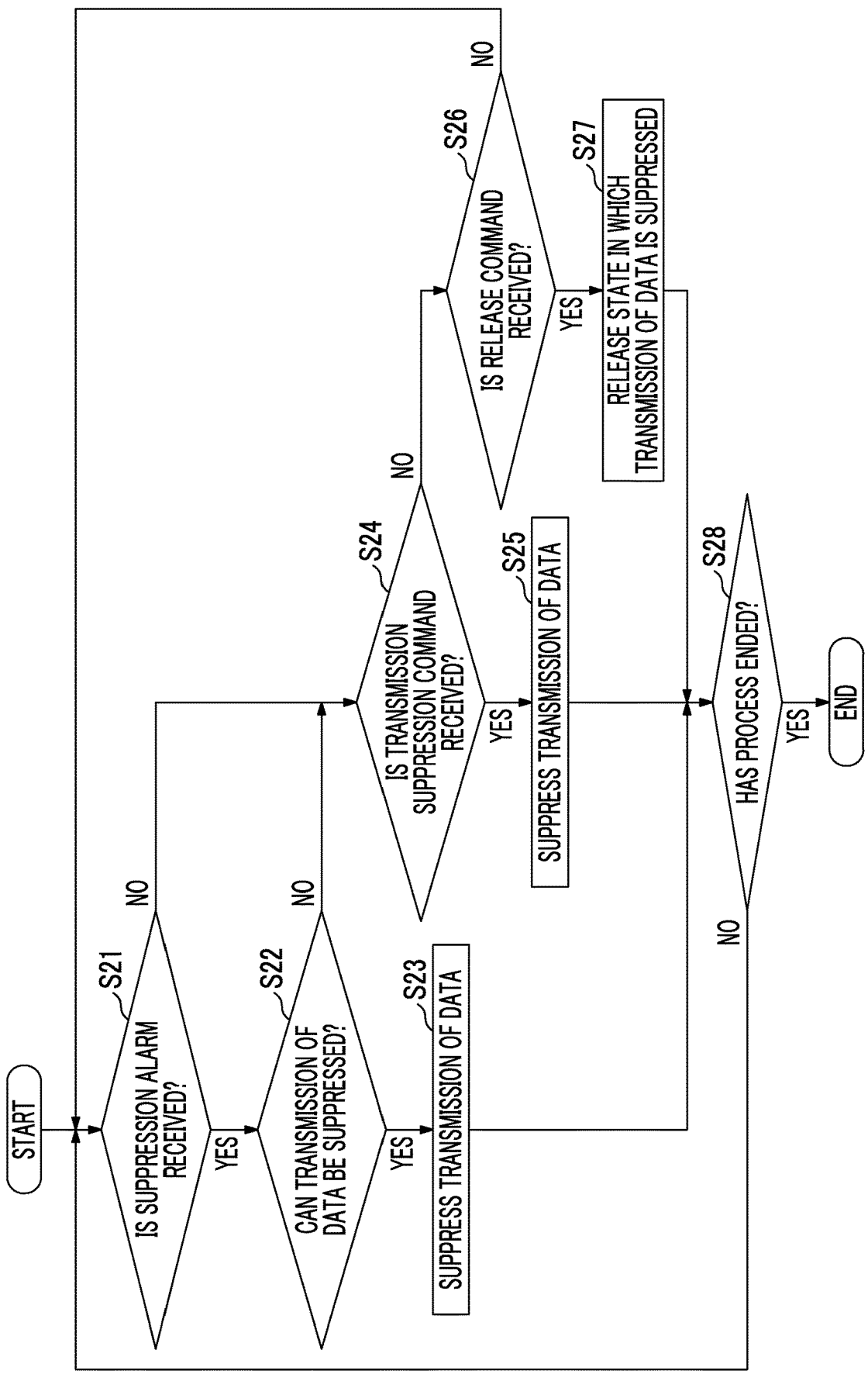
FIG. 9 is a flowchart illustrating a process that is executed by the ECU.

FIG. 9 is a flowchart illustrating a process that is executed by the ECU 130. Here, a transmission data suppression process that is executed by the suppression controller 130A will be described. The communication controller 130B performs transmission and reception of data separately from the flow illustrated in FIG. 9.

The suppression controller 130A starts the process. The suppression controller 130A starts the process, for example, when the ignition switch of the vehicle is turned ON. The above is the same as the CGW-ECU 110.

The suppression controller 130A determines whether or not the suppression alarm has been received from the CGW-ECU 110 (step S21).

When the suppression controller 130A determines that the suppression alarm is received (S21: YES), the suppression controller 130A determines whether or not the ECU 130 including the suppression controller 130A can suppress the transmission of data (step S22). The suppression controller 130A determines whether or not the ECU 130 including the suppression controller 130A can suppress the transmission of data based on the suppression possibility data (see FIG. 8A) stored in the ROM of the ECU 130 including the suppression controller 130A.

When the suppression controller 130A determines that the transmission of data can be suppressed (S22: YES), the suppression controller 130A causes the communication controller 130B to suppress the transmission of data (step S23).

Further, when the suppression controller 130A determines that the transmission of data cannot be suppressed (S22: NO), the suppression controller 130A determines whether or not the transmission suppression command has been received (step S24).

When the suppression controller 130A determines that the transmission suppression command has been received (S24: YES), the suppression controller 130A causes the communication controller 130B to suppress the transmission of data (step S25). The ECU 130 that transmits data with a low priority receives the transmission suppression command in step S25. Further, the data of which the transmission is suppressed in step S25 is the priority data illustrated in FIG. 8B, which is data of No. 2 (medium) and No. 3 (low).

Although the aspect in which the data of which the transmission is suppressed in step S25 is the pieces of data of No. 2 (medium) and No. 3 (low) has been described herein, the data of which the transmission is suppressed may be solely the data of No. 3 (low).

Further, when the suppression controller 130A determines that the transmission suppression command is not received (S24: NO), the suppression controller 130A determines whether or not a release command has been received from the CGW-ECU 110 (step S26).

When the suppression controller 130A determines that the release command has been received (S26: YES), the suppression controller 130A releases a state in which the transmission of data to the communication controller 130B is suppressed (step S27).

Further, when the suppression controller 130A determines that the release command has not been received (S26: NO), the flow returns to step S21.

Further, when the suppression controller 130A determines that the suppression alarm is not received (S21: NO), the flow proceeds to step S24.

When the suppression controller 130A ends the process of step S23, S25, or S27, the suppression controller 130A determines whether or not to end the process (step S28).

When the suppression controller 130A determines to end the process (S28: YES), the suppression controller 130A ends the series of processes. For example, when an ignition switch of the vehicle is turned OFF, the suppression controller 130A ends the process. The above is the same as the termination condition of the flow in the CGW-ECU 110.

As described above, the CGW-ECU 110 specifies the bus with the maximum amount of relay when the amount of relay of the CGW-ECU 110 is equal to or larger than 90% of the maximum amount of relay that can be relayed by the buses 121, 122, 123, 124, and issues a suppression alarm when the amount of relay is equal to or larger than the predetermined amount of relay (threshold). The ECU 130 that has received the suppression alarm suppresses the amount of relay. The amount of relay in the CGW-ECU 110 varies according to the state of the vehicle.

Accordingly, when the amount of relay is larger than the predetermined amount of relay (threshold), it is possible to suppress the amount of relay of data according to the state of the vehicle. As a result, it is possible to suppress the occurrence of loss of data in the CGW-ECU 110. The loss of the data is generally likely to occur when the amount of relay of data in the gateway device increases. Therefore, the CGW-ECU 110 determines whether or not the amount of relay of data is equal to or larger than 90% of the maximum amount of relay in step S2.

Further, the CGW-ECU 110 transmits the transmission suppression command to the ECU 130 that transmits data of which a priority in the state of the vehicle specified based on the type of data that is transferred by the buses 121 to 124 is relatively lower (data with a low priority) when the amount of relay of the data is larger than 70% of the maximum amount of relay after the suppression alarm is issued. The ECU 130 that has received the transmission suppression command suppresses transmitting pieces of data with a priority of No. 2 (medium) and No. 3 (low) among pieces of data that the ECU 130 transmits to the bus (any one of 121 to 124), to the bus (any one of 121 to 124).

Accordingly, when the amount of relay is larger than 70% of the maximum amount of relay, it is possible to suppress the amount of relay of pieces of data of No. 2 (medium) and No. 3 (low) of the ECU 130 that transmits data with a relatively low priority (a low priority) according to the state of the vehicle. A determination as to whether the amount of relay of data is equal to or larger than 70% of the maximum amount of relay is made after the suppression alarm is issued to suppress the loss of the data.

Further, when the ECU 130 receives the suppression alarm from the CGW-ECU 110, the ECU 130 suppresses the transmission of data when the suppression possibility data indicates that the transmission can be suppressed. Further, in a case where the transmission cannot be suppressed, the ECU 130 suppresses transmission of pieces of data with a priority of No. 2 (medium) and No. 3 (low) when receiving the transmission suppression command from the CGW-ECU 110.

Accordingly, when the amount of relay is larger than 70% of the maximum amount of relay, it is possible to suppress the amount of transmission of data according to the state of the vehicle and, as a result, to suppress the amount of relay of data using the CGW-ECU 110. Further, as a result, it is possible to suppress the loss of data in the CGW-ECU 110.

As described above, according to the first embodiment, it is possible to provide the in-vehicle network system 100 capable of suppressing the amount of relay of data according to the state of the vehicle.

Further, when the CGW-ECU 110 is a multi-protocol type as described above, the amount of relay of data in a protocol in which a communication speed is relatively higher is larger than that in a protocol in which the communication speed is relatively lower, and therefore, loss of data at the time of relay (relay loss) increases. As described above, when the buses 121 to 123 perform data communication according to an Ethernet protocol and the bus 124 performs data communication according to a CAN protocol, a communication speed of the data communication according to the Ethernet protocol is higher than that of the data communication according to the CAN protocol.

However, when the amount of relay is suppressed as described above, loss of data in a protocol with a relatively high communication speed can be suppressed. Therefore, it is possible to suppress the loss of data in data communication according to the Ethernet protocol.

The aspect in which the CGW-ECU 110 determines the amount of relay and performs the processes of step S1 to S6, and S11 in FIG. 7 has been described above. However, the CGW-ECU 110 may not perform the processes of steps S1 to S6, and S11. That is, the CGW-ECU 110 may not include the relay controller 111, the relay amount measurement unit 112, and the relay amount determination unit 113. In this case, the vehicle state detection unit 114 specifies the state of the vehicle based on a type of the data that is transferred by the buses 121 to 124 when the flow starts (step S7). The main controller 110A may determine whether or not to end the process when the transmission suppression command is transmitted in step S10 (step S12). Further, the ECU 130 may perform the processes of steps S24 and S25 shown in FIG. 9.

Further, the aspect in which the buses 121, 122, 123 are buses for communicating data according to the data format of Layer 2 of the Ethernet, the bus 124 is a bus for communicating data according to the data format of the CAN protocol, and the CGW-ECU 110 performs the process of converting the data format has been described above.

However, the buses 121, 122, 123 may be buses for communicating data according to the data format of Layer 3 or Layer 7 of the Ethernet. The data format of the data communicated by the buses 121, 122, 123 may be different from each other. The bus 124 may be a bus for communicating data according the data format of Layer 2, Layer 3, or Layer 7 of the Ethernet. In this case, the CGW-ECU 110 may convert the data format according to a protocol of the bus that is a transfer destination.

Further, the data formats of the data communicated by the buses 121, 122, 123, 124 may all be the same, and may be any one of Layer 2, Layer 3, and the Layer 7 of the Ethernet, and the CAN protocol. In this case, the CGW-ECU 110 does not perform the process of converting the data format.

Further, although the aspect in which the CGW-ECU 110 includes the main controller 110A, the relay controller 111, the relay amount measurement unit 112, the relay amount determination unit 113, the vehicle state detection unit 114, the relay controller 115, and the specifying unit 116 has been described above, the components may be provided outside the CGW-ECU 110.

Second Embodiment

Figure 10:
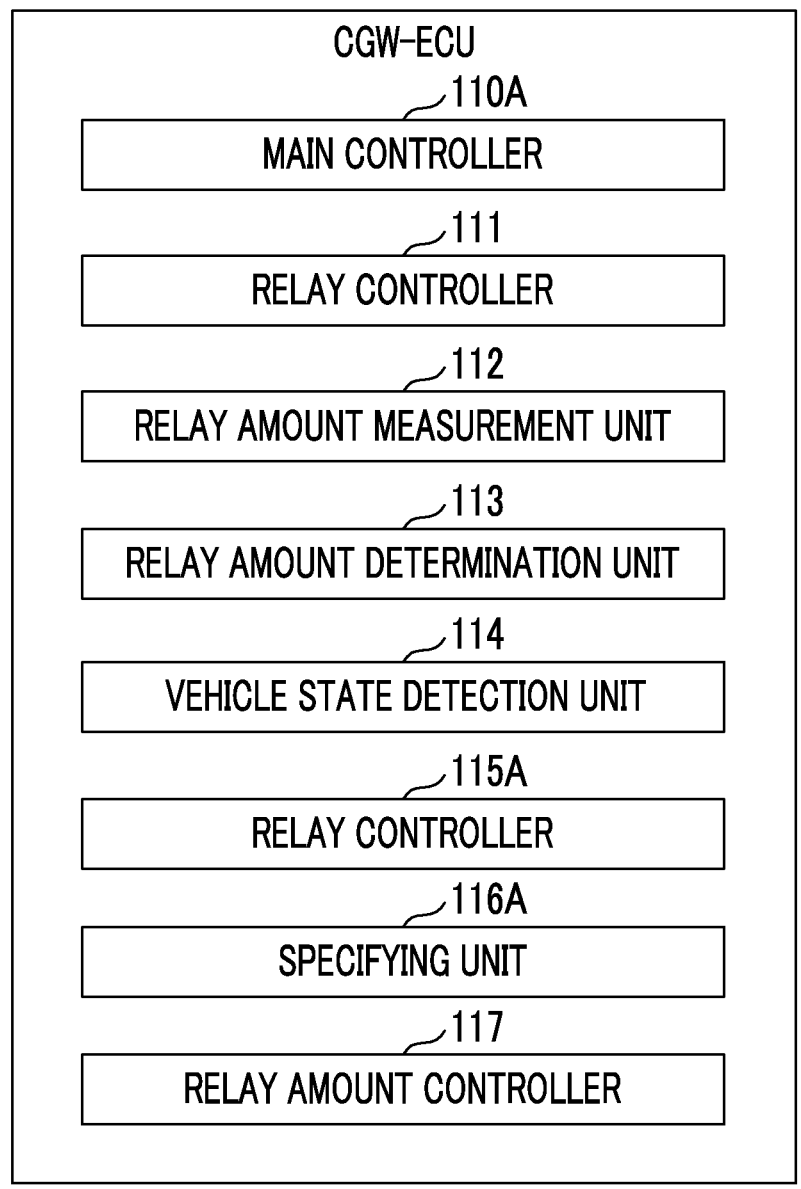
FIG. 10 is a diagram illustrating a CGW-ECU according to the second embodiment.

FIG. 10 is a diagram illustrating the CGW-ECU 210 of a second embodiment. The CGW-ECU 210 has a configuration in which the relay controller 115 and the specifying unit 116 of the CGW-ECU 110 of the first embodiment are replaced with a relay controller 115A and a specifying unit 116A, respectively, and a relay amount controller 117 is added. Since the main controller 110A, the relay controller 111, the relay amount measurement unit 112, the relay amount determination unit 113, and the vehicle state detection unit 114 are the same as those in the CGW-ECU 110 of the first embodiment, a difference will be mainly described herein.

After the relay amount determination unit 113 determines that the amount of relay is equal to or larger than 90% of the maximum amount of relay, the relay controller 115A issues a warning for suppressing the amount of relay of the bus with the maximum amount of relay. The above is the same as the relay controller 115 of the first embodiment.

Further, the relay controller 115A transmits a transmission suppression command to the bus specified by the specifying unit 116A in a predetermined state of the vehicle specified by the vehicle state detection unit 114 in a predetermined case after the bus with the maximum amount of relay is specified by the relay amount measurement unit 112. As a result, when the ECU 130 connected to the bus (any one of 121 to 124) specified by the specifying unit 116A suppresses the transmission of data to the bus, the amount of data communication on the bus is suppressed, and the amount of relay of the CGW-ECU 210 is suppressed. The relay controller 115A is an example of a first communication controller and a second communication controller.

The specifying unit 116A specifies a bus other than the bus (any one of 121 to 124) for transferring data related to the predetermined state of the vehicle that is specified by the vehicle state detection unit 114 when the relay amount determination unit 113 determines that the amount of relay is not equal to or smaller than 70% of the maximum amount of relay after the relay amount determination unit 113 determines that the amount of relay is equal to or greater than 90% of the maximum amount of relay and the warning for suppressing the amount of relay of the bus with the maximum amount of relay is issued. The data related to the predetermined state of the vehicle refers to control data that is communicated by the bus (any one of 121 to 124) in the predetermined state of the vehicle. The specifying unit 116A is an example of the first specifying unit.

When the amount of relay of the bus with the maximum amount of relay is equal to or larger than the predetermined amount of relay (threshold) (S4: YES) and when the relay amount determination unit 113 determines that the amount of relay of the CGW-ECU 110 is equal to or smaller than 70% of the maximum amount of relay (S6: YES), the relay amount controller 117 changes the allowable amount of relay so that the amounts of relay of the buses 121 to 124 become the read amounts of relay according to the state of the vehicle specified by the vehicle state detection unit 114. Details of the process that is executed by the relay amount controller 117 will be described below with reference to FIG. 12.

FIG. 11 is a diagram illustrating data that is used for a communication amount suppression process in the CGW-ECU 210. The data illustrated in FIG. 11 has a data structure in which data of the allowable amount of relay in each bus is added to the data illustrated in FIG. 5 in the first embodiment. The state of the vehicle, the data for specifying the state of the vehicle, and the control data that is used for control in the state of the vehicle are the same as those in FIG. 5, description thereof will be omitted.

The allowable amount of relay in each bus indicates a percentage (%) of the amount of relay allowed for each bus to a total amount of relay of buses 121 to 124. In a state of no detection, the allowable amounts of relay of the buses 121 to 124 are 20%, 30%, 30%, and 20%, respectively.

Further, the allowable amounts of relay of the buses 121 to 124 in the high-speed driving are 10%, 40%, 40%, and 10%, respectively, and the allowable amount of relay of the buses 122, 123 increases as compared to the state of no detection. This is because the engine ECU 132A, the PCS-ECU 132B, the LKA-ECU 132C, the brake ECU 133A, the steering ECU 133B, and the transmission ECU 133C associated with the control of the traveling system are connected the buses 122, 123.

Further, the allowable amounts of relay of the buses 121 to 124 in the autonomous driving are 35%, 30%, 25%, and 10%, respectively, and the allowable amount of relay of the bus 121 increases as compared to the state of no detection. This is because the autonomous driving ECU 131A is connected to the bus 121.

Further, the allowable amounts of relay of buses 121 to 124 in the automatic parking are 35%, 25%, 30%, and 10%, respectively, and the allowable amount of relay of the bus 121 increases as compared to the state of no detection. This is because the automatic parking ECU 131B is connected to the bus 121.

Further, the allowable amounts of relay of the buses 121 to 124 in reprogramming (wired) are 70%, 5%, 5%, and 20%, respectively. The allowable amount of relay of the bus 121 is increased and the allowable amounts of relay of the buses 122, 123 are decreased as compared to the state of no detection. Since the reprogramming ECU 131C is connected to the bus 121 and reprogramming (wired) is performed in a state in which the vehicle stops and the ignition is turned OFF, the allowable amounts of relay of the buses 122, 123 to which the engine ECU 132A, the PCS-ECU 132B, the LKA-ECU 132C, the brake ECU 133A, the steering ECU 133B, and the transmission ECU 133C associated with the control of the traveling system are connected are decreased.

Further, the allowable amounts of relay of the buses 121 to 124 in reprogramming (wireless) are 40%, 25%, 25%, 10%, respectively. The allowable amount of relay of the bus 121 is increased as compared to the state of no detection. The allowable amount of relay of the bus 121 is slightly decreased and the allowable amounts of relay of the buses 122, 123 are increased as compared to the reprogramming (wired). This is because the reprogramming (wireless) may be performed during traveling.

Figure 12:
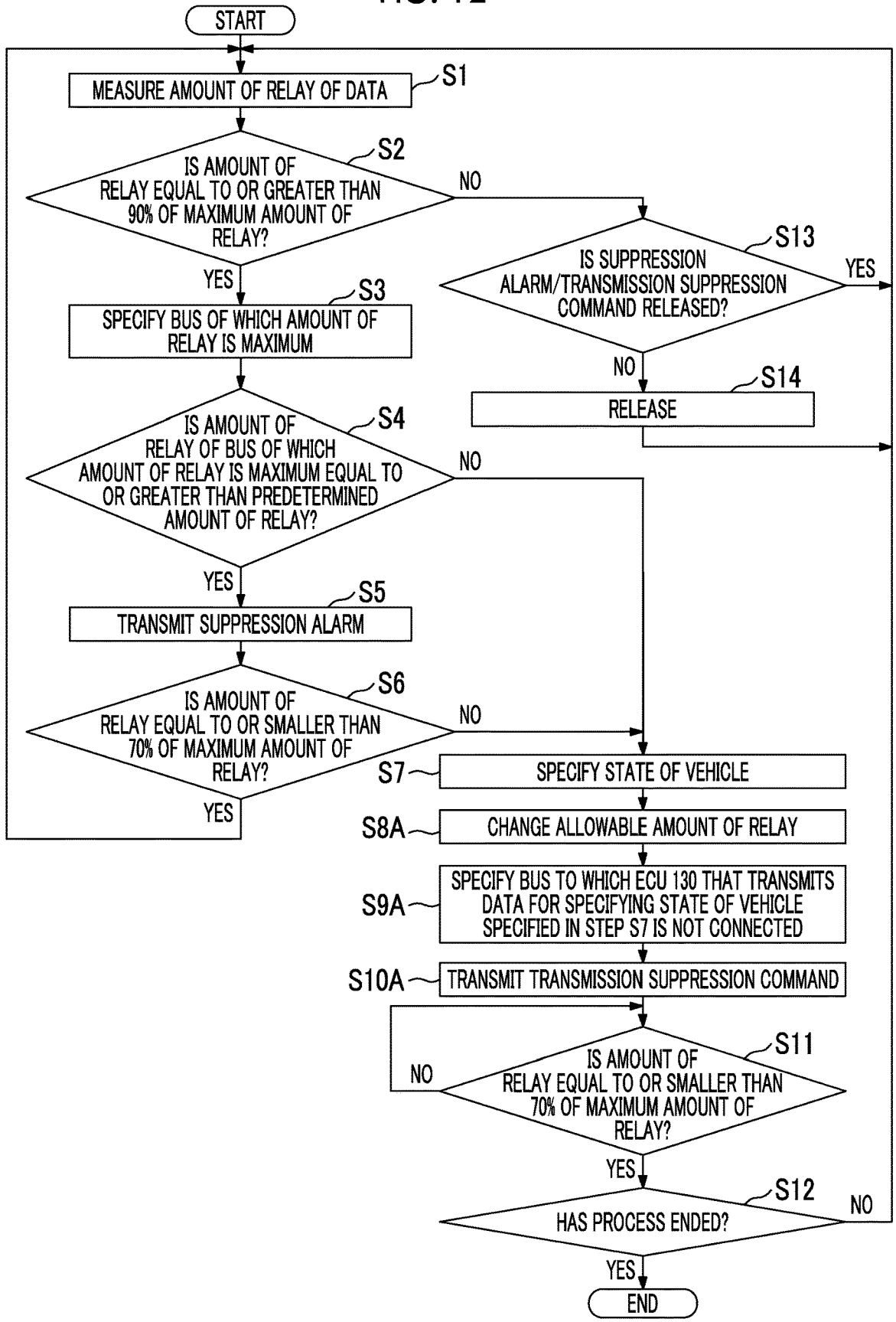
FIG. 12 is a diagram illustrating a flowchart of a process in which the CGW-ECU according to the second embodiment controls the amount of relay of a bus according to the state of a vehicle.

FIG. 12 is a diagram illustrating a flowchart of a process in which the CGW-ECU 210 of the second embodiment controls the amount of relay of the bus according to the state of the vehicle. Among processes illustrated in FIG. 12, steps S1 to S7 and S11 to S14 are the same as in the flow of the first embodiment illustrated in FIG. 7. The flowchart illustrated in FIG. 12 is obtained by replacing steps S8, S9, and S10 of the flowchart illustrated in FIG. 7 with step S8A, S9A, and S10A. Therefore, hereinafter, differences will be described.

The relay amount controller 117 reads data with the allowable amount of relay of the buses 121 to 124 associated with the state of the vehicle specified in step S7, and changes the allowable amount of relay such that the amount of relay of the buses 121 to 124 becomes the read amount of relay (step S8A).

Then, the specifying unit 116A specifies the bus (any one of 121 to 124) to which the ECU 130 that transmits data (see FIG. 11) for specifying the state of the vehicle specified in step S7 is not connected (step S9A). The bus to which the ECU 130 that transmits data for specifying the state of the vehicle specified in step S7 is not connected is a bus other than a bus for transferring data related to the predetermined state of the vehicle.

The relay controller 115A transmits the transmission suppression command to the bus specified by the specifying unit 116A (step S10A). As a result, the transmission suppression command is received by the ECU 130 connected to the bus (any one of 121 to 124) to which the ECU 130 that transmits data (see FIG. 11) for specifying the state of the vehicle specified in step S7 is not connected.

Then, the relay amount determination unit 113 determines whether or not the amount of relay of the CGW-ECU 210 is equal to or smaller than 70% of the maximum amount of relay that can be relayed by the buses 121, 122, 123, 124 (step S11). The process of step S11 is the same as the process of step S6.

Hereinafter, the CGW-ECU 210 performs the process of controlling the amount of relay, as in the first embodiment. The process that is executed by the ECU 130 that has received the transmission suppression command is the same as in the first embodiment, and is as illustrated in FIG. 9.

As described above, since the CGW-ECU 210 issues the suppression alarm, similar to the CGW-ECU 110 in the first embodiment, it is possible to suppress the amount of relay of data according to the state of the vehicle when the amount of relay is larger than 70% of the maximum amount of relay. As a result, it is possible to suppress the occurrence of loss of data in the CGW-ECU 210.

Further, the CGW-ECU 210 transmits the transmission suppression command to the bus (any one of 121 to 124) to which the ECU 130 that transmits data for specifying the state of the vehicle specified by the vehicle state detection unit 114 is not connected, when the amount of relay of the data is larger than 70% of the maximum amount of relay after the suppression alarm is issued. The ECU 130 that has received the transmission suppression command suppresses transmitting pieces of data with a priority of No. 2 (medium) and No. 3 (low) among pieces of data that the ECU 130 transmits to the bus (any one of 121 to 124), to the bus (any one of 121 to 124).

Accordingly, when the amount of relay is larger than 70% of the maximum amount of relay, it is possible to suppress the amount of relay of pieces of data of No. 2 (medium) and No. 3 (low) of the ECU 130 that transmits data with a relatively low priority (a low priority) according to the state of the vehicle.

As described above, according to the second embodiment, it is possible to provide the in-vehicle network system capable of suppressing the amount of relay of data according to the state of the vehicle.

Although the in-vehicle network system of the exemplary embodiments of the present disclosure has been described above, the present disclosure is not limited to the specifically disclosed embodiments, and various modifications and changes can be made without departing from the scope of the claims.

What is claimed is:

1. An in-vehicle network system comprising:
a central gateway electronic control unit (CGW-ECU) including a processor for executing programs stored in memory, a plurality of network buses, the network buses connecting a plurality of controllers configured to perform control of a vehicle;
a plurality of transfer paths connected to the plurality of controllers;
a relay device configured to relay data between the transfer paths, the relay device being connected to the transfer paths;
the CGW-ECU configured to:
detect a predetermined state of the vehicle;
detect and specify a transfer path other than a transfer path that transfers data related to the predetermined state detected by the CGW-ECU;
suppress communication of data to the transfer path specified by the CGW-ECU;
acquire an amount of relay by which the relay device relays the data; and
specify a controller of the plurality of controllers that transmits data with a relatively low priority or a transfer path other than the transfer path that transfers data related to the predetermined state when the amount of relay is equal to or larger than a predetermined amount.

2. The in-vehicle network system according to claim 1, wherein the CGW-ECU suppresses communication of the data by transmitting a suppression command for suppressing data transmission to a controller of the plurality of controllers that is specified or the transfer path that is specified by the CGW-ECU.

3. The in-vehicle network system according to claim 2, the CGW-ECU further configured to:
change an amount of relay by which the relay device relays data to each of the transfer paths;
change the amount of relay so that an amount of relay in all of transfer paths is reduced according to the predetermined state of the vehicle detected when the CGW-ECU suppresses the communication of data to the transfer path specified; and
transmit a suppression command for suppressing the data transmission to the transfer path specified by the CGW-ECU in a state in which the amount of relay is changed by the CGW-ECU.

4. The in-vehicle network system according to claim 2, the CGW-ECU further configured to:
specify a transfer path in which an amount of relay by which the relay device relays data to each of the transfer paths is maximum; and
suppress an amount of communication of data in the transfer path with the maximum amount of relay when the amount of relay in the transfer path specified by the CGW-ECU is equal to or larger than a predetermined amount.

5. The in-vehicle network system according to claim 4, wherein:

when the amount of relay in the transfer path specified is smaller than the predetermined amount, the CGW-ECU detects the predetermined state;

the CGW-ECU specifies a controller of the plurality of controllers that transmits data with a relatively low priority or a transfer path other than the transfer path that transfers data related to the predetermined state; and the CGW-ECU causes the controller of the plurality of controllers specified to suppress the communication of data or suppress communication of data to the transfer path specified by the CGW-ECU.

6. The in-vehicle network system according to claim 4, wherein when the amount of relay in the transfer path specified is equal to or larger than a predetermined amount after the CGW-ECU suppresses the amount of communication of data in the transfer path with the maximum amount of relay, the CGW-ECU detects the predetermined state, the CGW-ECU specifies a controller that transmits data with a relatively low priority or a transfer path other than the transfer path that transfers data related to the predetermined state, and the CGW-ECU causes the controller specified to suppress the communication of data or suppress communication of data to the transfer path specified.

7. An in-vehicle network system comprising:

a central gateway electronic control unit (CGW-ECU) including a processor for executing programs stored in memory, a plurality of network buses, the network buses connecting a plurality of controllers configured to perform control of a vehicle;

a plurality of transfer paths connected to the plurality of controllers;

a relay device configured to relay data between the transfer paths, the relay device being connected to the transfer paths;

the CGW-ECU configured to:

detect a predetermined state of the vehicle;

detect and specify a transfer path other than a transfer path that transfers data related to the predetermined state detected by the CGW-ECU;

suppress communication of data to the transfer path specified by the CGW-ECU;

specify a transfer path in which an amount of relay by which the relay device relays data to each of the transfer paths is maximum; and suppress an amount of communication of data in the transfer path with the maximum amount of relay when the amount of relay in the transfer path specified by the CGW-ECU is equal to or larger than a predetermined amount, wherein the CGW-ECU suppresses the communication of the data by transmitting a suppression command for suppressing data transmission to a controller of the plurality of controllers that is specified or the transfer path that is specified by the CGW-ECU.

8. A vehicle control method for an in-vehicle network system, the in-vehicle network system including a central gateway electronic control unit (CGW-ECU) including a processor for executing programs stored in memory, a plurality of network buses, the network buses connecting a plurality of controllers configured to perform control of a vehicle, a plurality of transfer paths connected to the plurality of controllers, and a relay device configured to relay data between the transfer paths, the relay device being connected to the transfer paths, the method comprising the steps of:

detecting a predetermined state of the vehicle;

detecting and specifying a transfer path other than a transfer path that transfers data related to the predetermined state detected by the CGW-ECU;

suppressing communication of data to the transfer path specified by the CGW-ECU;

acquiring an amount of relay by which the relay device relays the data; and specifying a controller of the plurality of controllers that transmits data with a relatively low priority or a transfer path other than the transfer path that transfers data related to the predetermined state when the amount of relay is equal to or larger than a predetermined amount.

9. A vehicle control method for an in-vehicle network system, the in-vehicle network system including a central gateway electronic control unit (CGW-ECU) including a processor for executing programs stored in memory, a plurality of network buses, the network buses connecting a plurality of controllers configured to perform control of a vehicle, a plurality of transfer paths connected to the plurality of controllers, and a relay device configured to relay data between the transfer paths, the relay device being connected to the transfer paths, the method comprising the steps of:

detecting a predetermined state of the vehicle;

detecting and specifying a transfer path other than a transfer path that transfers data related to the predetermined state detected by the CGW-ECU;

suppressing communication of data to the transfer path specified by the CGW-ECU;

specifying a transfer path in which an amount of relay by which the relay device relays data to each of the transfer paths is maximum; and suppressing an amount of communication of data in the transfer path with the maximum amount of relay when the amount of relay in the transfer path specified by the CGW-ECU is equal to or larger than a predetermined amount, wherein the CGW-ECU suppresses the communication of the data by transmitting a suppression command for suppressing data transmission to a controller of the plurality of controllers that is specified or the transfer path that is specified by the CGW-ECU.

* * * * *